United States Patent [19]

Hanawa et al.

[11] Patent Number: 5,740,401
[45] Date of Patent: Apr. 14, 1998

[54] MULTIPROCESSOR SYSTEM HAVING A PROCESSOR INVALIDATING OPERAND CACHE WHEN LOCK-ACCESSING

[75] Inventors: Makoto Hanawa, Niiza; Tadahiko Nishimukai, Sagamihara; Osamu Nishii, Kokubunji; Makoto Suzuki, Niiza, all of Japan

[73] Assignee: Hitachi, Ltd., Tokyo, Japan

[21] Appl. No.: 9,077

[22] Filed: Jan. 26, 1993

[30] Foreign Application Priority Data

Jan. 31, 1992 [JP] Japan ............................. 4-015912

[51] Int. Cl.⁶ ............................. G06F 12/14; G06F 12/08
[52] U.S. Cl. ............................ 395/479; 395/450; 395/453; 395/482; 395/477; 395/478; 395/471
[58] Field of Search ....................... 395/425, 479, 395/450, 453, 482, 477, 478, 471; 364/228.1, 246.8, DIG. 1

[56] References Cited

U.S. PATENT DOCUMENTS

| | | | |
|---|---|---|---|
| 4,561,051 | 12/1985 | Rodman et al. | 395/479 |
| 4,709,326 | 11/1987 | Robinson | 395/726 |
| 4,733,352 | 3/1988 | Nakamura et al. | 395/479 |
| 4,858,116 | 8/1989 | Gillett, Jr. et al. | 395/482 |
| 4,891,749 | 1/1990 | Hoffman et al. | 395/479 |
| 4,924,466 | 5/1990 | Gregor et al. | 395/181 |
| 4,984,153 | 1/1991 | Kregness et al. | 395/479 |
| 5,142,676 | 8/1992 | Fried et al. | 395/479 |
| 5,276,847 | 1/1994 | Kohn | 395/490 |
| 5,291,581 | 3/1994 | Cutler et al. | 395/479 |
| 5,301,290 | 4/1994 | Tetzlaff et al. | 395/469 |
| 5,327,570 | 7/1994 | Foster et al. | 395/800 |
| 5,341,491 | 8/1994 | Ramanujan | 395/479 |
| 5,355,467 | 10/1994 | MacWilliams et al. | 395/473 |
| 5,408,629 | 4/1995 | Tsuchiya et al. | 395/475 |

OTHER PUBLICATIONS

"Computer System Study Report", CPSY90–4; Institute of Electronics, Information and Communication Engineers; Apr. 20, 1990; pp. 25–32.

Primary Examiner—Eddie P. Chan
Assistant Examiner—Reginald G. Bragdon
Attorney, Agent, or Firm—Antonelli, Terry, Stout, & Kraus, LLP

[57] ABSTRACT

A multiprocessor system includes an address bus 170, a data bus 180, processors 110 and 120, access queues 135 and 145, shared memories 130 and 140, and lock control circuits 500 and 510. Particularly, a lock-in indicative flag register 501 is provided in the lock control circuit 500. While an operand cache 112 in one processor 110 is making a lock access to a predetermined address of the shared memory 130, the flag register 501 is set on the basis of a lock command signal 260 so that an access of an instruction cache 122 in another processor 120 to the predetermined address of the shared memory 130 is prohibited but an access to a different address is permitted at the time of the lock access. After the lock access is released, the lock control circuit 500 accepts an access to the predetermined address.

3 Claims, 9 Drawing Sheets

FIG. 2

MULTIPROCESSOR SYSTEM HAVING A PROCESSOR INVALIDATING OPERAND CACHE WHEN LOCK-ACCESSING

CROSS-REFERENCE TO RELATED APPLICATION

This application relates to U.S. patent application Ser. No. 07/784,546 filed on Oct. 29, 1991 by Makoto Hanawa et al., now U.S. Pat. No. 5,375,215, issued on Dec. 20, 1994 entitled "MULTIPROCESSOR SYSTEM HAVING A PROCESSOR INVALIDATING OPERAND CACHE WHEN LOCK-ACCESSING", and assigned to the present assignee. The content of that application is incorporated herein by reference.

BACKGROUND OF THE INVENTION

The present invention relates to a multiprocessor system having a plurality of processors connected through a shared bus and, particularly, relates to a shared bus exclusive control method adapted for use with a one-chip multiprocessor provided by forming a plurality of processors and a shared memory on a single chip by large scale integration.

Improvement in transfer throughput of a shared bus in a multiprocessor system having a plurality of microprocessors connected through the shared bus has been discussed on pages 25 through 32 of "Computer System Study Report", CPSY90-4, published by the Institute of Electronics, Information and Communication Engineers, on Apr. 20, 1990.

The report has proposed a split scheme shared bus transfer method in which a sender unit, as a processor, first releases a shared bus after sending an order (address/data) to the shared bus so that a receiver unit, such as a memory, can acquire ownership of the shared bus to return an answer (return data) to the sender unit when the receiver unit becomes ready for returning the answer (return data).

Accordingly, the split scheme shared bus transfer method can provide efficient use of the shared bus to make it possible to improve transfer throughput thereof, compared with a conventional, interlock scheme in which the shared bus is occupied by one processor during a period from address sending to data returning.

In such a multiprocessor system, data stored in a memory accessed by a plurality of processors is called "shared data". Particularly, there is a possibility that a plurality of processors may access one memory address (shared variable) simultaneously. In this case, a data access conflict occurs so that malfunctioning may result from data being mixed up during processing. It is therefore necessary to provide exclusive control by which only one processor is permitted to access shared data, such as a shared variable, at a certain point in time. Bus locking can be used as a means for providing such exclusive control. Bus locking is a technique for providing exclusive access by continuously giving ownership of a shared bus to only one processor which is permitted to access shared data without giving ownership of the shared bus to other processors.

Therefore, in the conventional split scheme shared bus transfer method, read/write consists of a series of processes, such as processes carried out in response to TEST&SET instructions. In the case where a conflict occurs, such as when a transfer of data from another unit enters into the series of processes, a lock transfer function in which the shared bus is used monopolistically without releasing is provided.

When the shared bus is locked, as described above, however, an improvement in transfer throughput of the shared bus, which is the primary advantage of the split scheme, is spoiled. A decline in the efficiency will be expected to appear as a severe problem, when the exclusive control is used frequently for the purpose of increasing the job processing speed by dividing the job into a plurality of parts and processing those parts in parallel using a plurality of processors.

In the aforementioned conventional method, there is no consideration given to the possibility of a decline in efficiency caused by a bus lock. There arises a problem in that the efficiency decreases greatly in the case where one job is divided into small groups to be processed in parallel by a plurality of processors.

SUMMARY OF THE INVENTION

An object of the present invention is to a multiprocessor system in which the advantage of a split bus is retained while exclusive access to shared data is secured, and non-exclusive access can be processed in parallel with exclusive access.

The foregoing object of the invention is achieved by a control method according to the basic technical idea of the invention, in which acceptance of a memory access request to shared data, given from another processor, is rejected but acceptance of a memory access request to data other than shared data, given from another processor, is permitted, while a first processor makes access to the shared data in the shared memory.

The typical features of the present invention disclosed in this application are as follows.

The multiprocessor system comprises:
- a plurality of processors (110, 120) connected to each other through a bus (170, 180); and
- a memory (130, 140) for storing data shared by the processors (110, 120), which memory is connected to the bus (170, 180);

the system further comprising:
- a memory access control circuit (500, 510) for controlling memory access so that, while one (110) of the processors (110, 120) is making access to the shared data in the memory (130, 140), an acceptance of a memory access request to the shared data, given from the other processor (120), is rejected on the one hand, and acceptance of a memory access request to an address except the address of the shared data, given from the other processor (120), is permitted on the other hand.

In a preferred embodiment of the invention, the multiprocessor system further comprises access queues (135, 145) connected both to the bus (170, 180) and to the memory (130, 140). Each of the access queues (135, 145) is constituted by a first-in first-out memory for storing access request addresses transmitted through the bus so that the memory access control circuit (500, 510) prohibits the memory access request to the shared data of the memory, given by the other processor (120), from being stored in the access queues (135, 145) during a period between a point in time when the memory access request to the shared data of the memory, given by one processor (110), is stored in the access queues (135, 145) and a point in time when the access to the shared data of the memory using the access queues (135, 145) is finished.

The concrete methods for detecting that the access is to the shared data are as follows:
(1) Detecting access to the shared data with respect to the whole shared memory;
(2) Dividing the shared memory into a plurality of banks and detecting access to the shared data with respect to each bank;

(3) Dividing the shared memory into a plurality of areas and detecting access to the shared data with respect to each area;

(4) Identifying the address of the shared data and detecting access to the shared data with respect to each address. More specifically, the following methods are provided.

(1) A method in which only one processor is permitted to make access to shared data in a shared memory is provided as a first embodiment. That is, a shared memory exclusive access control can be achieved by providing: means for indicating that the access is to shared data in the shared memory when a processor requests memory access; a flag for indicating that a processor currently is making access to the shared data in the shared memory; and means for prohibiting another processor from making access to the shared data in the shared memory while the flag is set.

(2) A method in which only one processor is permitted to make access to shared data in one of a plurality of banks, into which the shared memory has been divided, is provided as a second embodiment. That is, shared memory exclusive access control can be achieved by providing: means for indicating that an access is to shared data in the shared memory when a processor requests memory access; a flag for indicating that a processor currently is making access to shared data in a bank in the shared memory; and means for prohibiting another processor from making access to that bank in the shared memory while the flag is set.

(3) A method in which only one processor is permitted to make access to shared data in one of a plurality of areas, into which the shared memory has been divided, is provided as a third embodiment. That is, shared memory exclusive access control can be achieved by providing: means for indicating that the access is to shared data in the shared memory when a processor requests memory access; a flag for indicating that a processor currently is making access to shared data in an area in the shared memory; and means for prohibiting another processor from making access to that area in the shared memory while the flag is set.

(4) A method in which only one processor is permitted to make access to shared data in an address location is provided as a fourth embodiment. That is, shared memory exclusive access control can be achieved by providing: means for indicating that an access is to shared data in the shared memory when a processor requests memory access; a flag for indicating that a processor currently is making access to shared data in an address location in the shared memory; and means for prohibiting another processor from making access to that address location in the shared memory while the flag According to the present invention, the memory access control circuit (500, 510) controls memory access so that, while one (110) of the processors (110, 120) makes access to the shared data in the memory (130, 140), an acceptance of a memory access request to the shared data, given from the other processor (120), is rejected on the one hand, and an acceptance of a memory access request to the non-shared data, given from the other processor (120), is permitted on the other hand. Accordingly, a multiprocessor system is provided in which the advantage of a split bus is retained, while exclusive access to shared data is secured, and non-exclusive access can be processed in parallel with exclusive access.

That is, two accesses requested by different processors to one address in the memory are originally exclusive.

Accordingly, accesses can be made exclusive by rejecting acceptance of memory access requests to the same address, given by different processors, or by rejecting acceptance of a memory access request to the bank/area/address currently used by one processor, given by the other processor, even in the case where one processor gives bus ownership to the other processor before the second access. Accordingly, there is no interference with other processors, and the malfunctioning caused by conflict of access requested by a plurality of processors to shared data can be avoided.

Furthermore, accesses to different addresses can be processed in parallel, while exclusive access is currently made. Accordingly, the throughput of the bus can be improved.

Other objects and features of the invention will become clear from the following description of preferred embodiments.

BRIEF DESCRIPTION OF THE DRAWINGS

FIG. 2 is a time chart for explaining a general pipeline operation performed by the system of FIG. 1;

DESCRIPTION OF THE PREFERRED EMBODIMENTS

An embodiment of the present invention will be described below with reference to the drawings.

Outline of System

Figure 1:
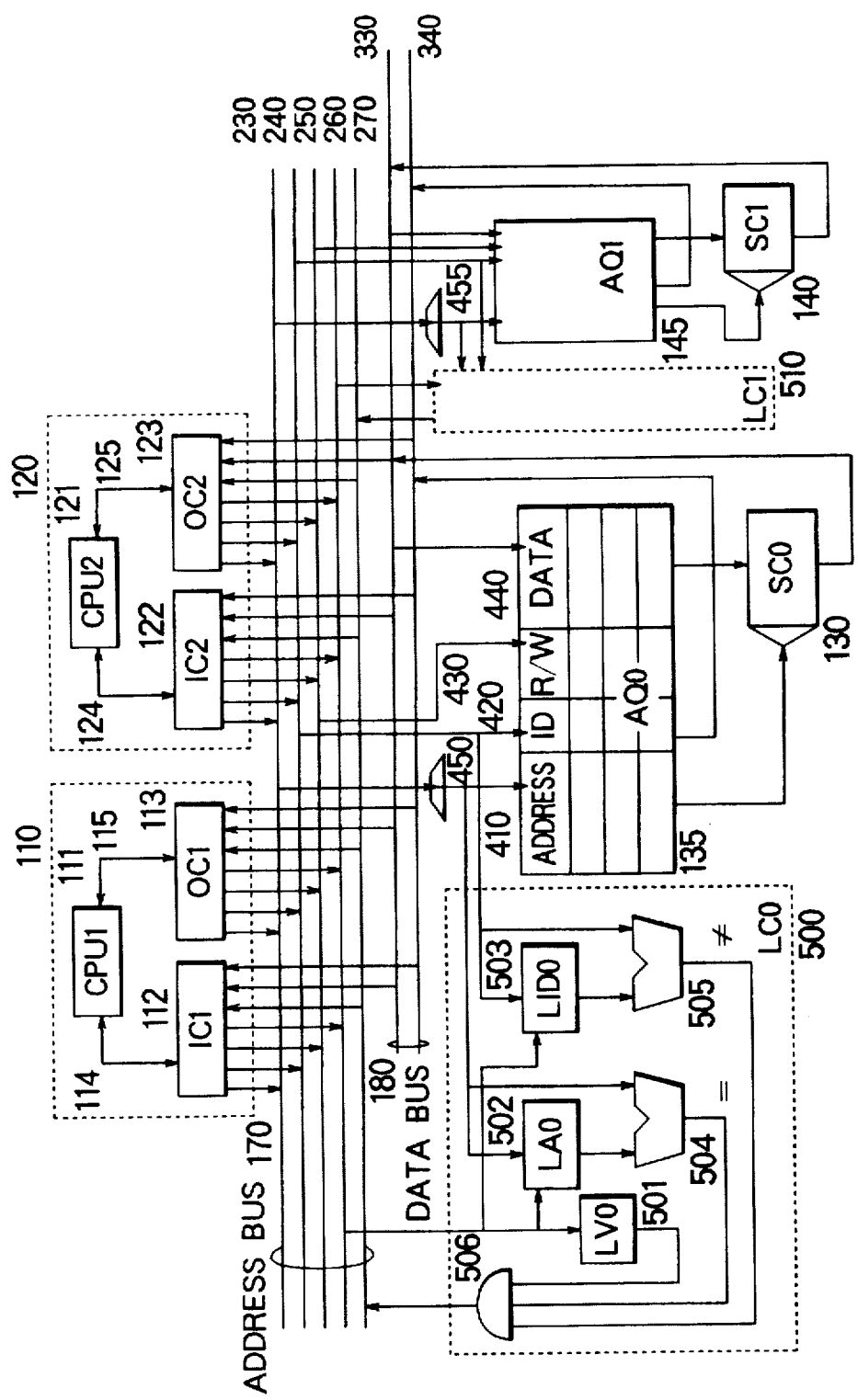
FIG. 1 is a schematic block diagram showing a multiprocessor system having an exclusively controllable memory as one embodiment of the present invention.

FIG. 1 is a block diagram showing the structure of a one-chip multiprocessor system forming an embodiment of the present invention. Two processor elements 110 and 120 and two banks of memories 130 and 140 are formed on a single chip by LSI. The processor elements 110 and 120 are connected to the memories 130 and 140 through access queues 135 and 145, an address bus 170 and a data bus 180. Further, lock control circuits 500 and 510 are provided in correspondence with the access queues 135 and 145, respectively.

Structure of Processor Element (PE)

The processor element 110 comprises a central processing unit (CPU1) 111, an instruction cache (IC1) 112, an operand cache (OC1) 113, an instruction-bus 114, and an operand-bus 115, which are connected as shown in the drawing. The processor element 120 has the same structure as that of the processor element 110. Detailed description of the processor element 120 will be omitted.

Instruction Cache in PE

The instruction cache IC1 (112) in the processor element 110 is searched in accordance with an instruction fetch request given by the CPU1 (111), so that a judgment is made as to whether a copy of corresponding data is present in the instruction cache IC1 (112).

In the case where the requested instruction is present in the instruction cache IC1 (112), that is, in the case of a hit, the data is read from a cache memory part of the instruction cache IC1 (112) without accessing the memories 130 and 140 and is transferred to the CPU1 (111) through the instruction-bus 114. The CPU1 (111) decodes the read data as an instruction and executes the instruction.

In the case where a copy of data with respect to the instruction fetch request given by the CPU1 (111) is absent in the instruction cache IC1 (112), that is, in the case of a miss, the corresponding data is read by accessing either of the memories 130 and 140 and is stored in the instruction cache IC1 (112) and, at the same time, is transferred to the CPU1 (111) through the instruction-bus 114.

The instruction cache IC2 (122) in the processor element 120 has the same structure as that of the instruction cache IC1 (112) in the processor element 110. Detailed description of the instruction cache IC2 (122) will be omitted.

Operand Cache in PE

The operand cache OC1 (113) in the processor element 110 is also searched in accordance with an operand access request given by the CPU1 (111), so that a judgment is made as to whether a copy of corresponding data is present in the operand cache OC1 (113).

In the case where the requested operand is present in the operand cache OC1 (113), the data is read from a cache memory part of the operand cache OC1 (113) without accessing the memories 130 and 140 and is transferred to the CPU1 (111) through the operand-bus 115. The CPU1 (111) uses the read data as an operand in the execution of an instruction.

In the case where a copy of data with respect to the operand access request given by the CPU1 (111) is absent in the operand cache OC1 (113), the corresponding data is read by accessing either of the memories 130 and 140 and is stored in the operand cache OC1 (113) and, at the same time, is transferred to the CPU1 (111) through the operand-bus 115.

The processor element 120 also comprises a central processing unit (CPU2) 121, an instruction cache (IC2) 122, an operand cache (OC2) 123, an instruction-bus 124 and an operand-bus 125, which are connected as shown in the drawing.

Memory and Access Queue

The memory is divided into two banks 130 and 140 which are connected to an address bus 170 and a data bus 180 through access queues 135 and 145, respectively.

The access queues 135 and 145 are first-in first-out (FIFO) buffers in which memory access requests from the instruction caches (IC1 and IC2) 112 and 122 and the operand caches (OC1 and OC2) 113 and 123 are latched.

Bus

The address bus 170 comprises address signal lines 230, identification number lines 240, a read/write signal line 250, a lock command signal line 260, and a retry command signal line 270.

The identification number lines 240 are composed of three signal lines for identifying the six devices: instruction caches IC1 (112) and IC2 (122), operand caches OC1 (113) and OC2 (123) and memories SC0 (130) and SC1 (140).

The data bus 180 comprises data signal lines 330, and identification number lines 340. The identification number lines 340 comprise three signal lines, for the same purpose as that in the identification number line 240 of the address bus 170.

Lock Control Circuit

The lock control circuit (LC0) 500 comprises a lock-in indicative flag register (LV0) 501, a lock address register (LA0) 502, a lock identification number register (LID0) 503, an address comparator 504, an identification number comparator 505, and an AND gate 506. The lock control circuit (LC1) 510 has the same structure as that of the lock control circuit (LC0) 500.

The lock-in indicative flag register (LV0) 501 is set when the lock command signal line 260 is asserted at the time of address transfer.

When the lock-in indicative flag register (LV0) 501 is set, the contents of the address signal line 230 and the identification number line 240 are set to the lock address register (LA0) 502 and the lock identification number register (LID0) 503, respectively.

The address comparator 504 and the identification number comparator 505 respectively compare the contents of the lock address register (LA0) 502 and the lock identification number register (LID0) 503 with the values of the address signal line 230 and the identification number line 240 at the time of address transfer. In the case where the two inputs to the address comparator 504 coincide with each other, logic "1" is asserted as an output from the address comparator 504. On the other hand, in the case where the two inputs to the identification number comparator 505 do not coincide with each other, logic "1" is asserted as an output from the identification number comparator 505. Accordingly, when a device which has different identification number issues an access request to the same address in the condition in which-the lock-in indicative flag register (LV0) 501 is set, an acceptance of the access request from the device is rejected because the retry command signal line 270 is asserted by the AND gate 506.

General Pipeline Operation

A general pipeline operation for split scheme bus transfer which is free from bus locking will be described below. The operations of respective constituent elements will be described in the case where the instruction cache IC1 (112) starts reading data stored in the memory SC0 (130).

First, the instruction cache IC1 (112) acquires an address bus ownership, i.e., the right of using the address bus 170, and sends signals of predetermined values to the address signal lines 230, the identification number lines 240 and the read/write signal line 250. Here, the identification number of the instruction cache IC1 (112) is sent to the identification number lines 240.

The access queue 135 of the memory SC0 (130) judges the access to the memory SC0 (130) by the lower 1 bit of the address signal lines 230 and latches the contents of the address signal lines 230, the identification number line 240 and the read/write signal lines 250. The access requests latched in the access queue 135 are successively processed when the memory SC0 (130) is permitted to be accessed.

The operation of the constituent elements will be described in the case where the memory SC0 (130) transfers read data to the instruction cache IC1 (112) in accordance with a request from the instruction cache IC1 (112). First, the memory SC0 (130) acquires the data bus ownership, i.e., the right of using the data bus 180, and sends predetermined values to the data signal lines 330 and the identification number lines 340. Here, the identification number of the instruction cache IC1 (112) latched in the access queue 135 as an access requester is sent to the identification number lines 340. After the address is sent out, the instruction cache IC1 (112) opens the address bus 170 and waits for a transfer of the read data while watching the identification number lines 340 of the data bus 180. Therefore, when the instruction cache IC1 (112) detects the identification number sent from the memory SC0 (130), it recognizes the response cycle to the instruction cache IC1 (112) and latches data transferred on the data signal lines 330.

The internal structure of the access queue (AQ0) 135 will be described below with reference to FIG. 1. The other access queue (AQ1) 455 has the same structure as that of the access queue (AQ0) 135.

The access queue 135 is a four-entry first-in first-out buffer (FIFO). Each entry is composed of an address portion 410, an identification number portion 420, a read/write portion 430, and a write data portion 440. The address portion 410 latches the contents of the address signal lines 230 of the address bus 170. The identification number portion 420 latches the contents of the identification number lines 240. The read/write portion 430 latches the contents of the read/write signal line 250. The write data portion 440 latches the contents (data to be written) of the data signal lines 330 of the data bus 180 at the time of writing data to the memory.

As described above, memory access requests from devices such as the instruction cache IC1 (112) to the memory SC0 (130) are first latched in the access queue 135. Accordingly, the address bus 170 can be released to other devices without waiting for transfer of the read data.

Even in the case where, in the middle of the processing of a memory access request from one device, another device issues a request to the same memory, the memory access request is buffered because the access queue has a plurality of entries.

Since this embodiment involves the case where memory access requests are issued from four devices including the instruction cache IC1 (112), operand cache OC1 (113), instruction cache IC2 (122) and operand cache OC2 (123), it is sufficient for the access queue to have four buffer stages, because one device never issues a plurality of access requests at once (because the next access request is not issued before the current access is finished).

In the case where one device access requestality of access requests at once, this embodiment can be utilized by increasing the number of buffer stages in the access queue and providing a means for identifying the access requests being issued.

As described above, the access requests latched in the access queue 135 are processed successively so that the first latched request is outputted first by the first-in first-out buffer (FIFO).

Each of the address decoders 450 and 455 judges-, by the lower 1 bit of the address signal lines 230 of the address bus 170, which memory, SC0 (130) or SC1 (140), the access request is directed to, and causes the access queue of a corresponding memory to latch the access request. When, for example, the lower 1 bit of the address signal line 230 of the address bus 170 is "0", the address decoder 450 causes the access queue 135 to latch the access request. When, for example, the lower 1 bit of the address signal line 230 is "1", the address decoder 455 causes the access queue 145 to latch the access request.

Figure 2:
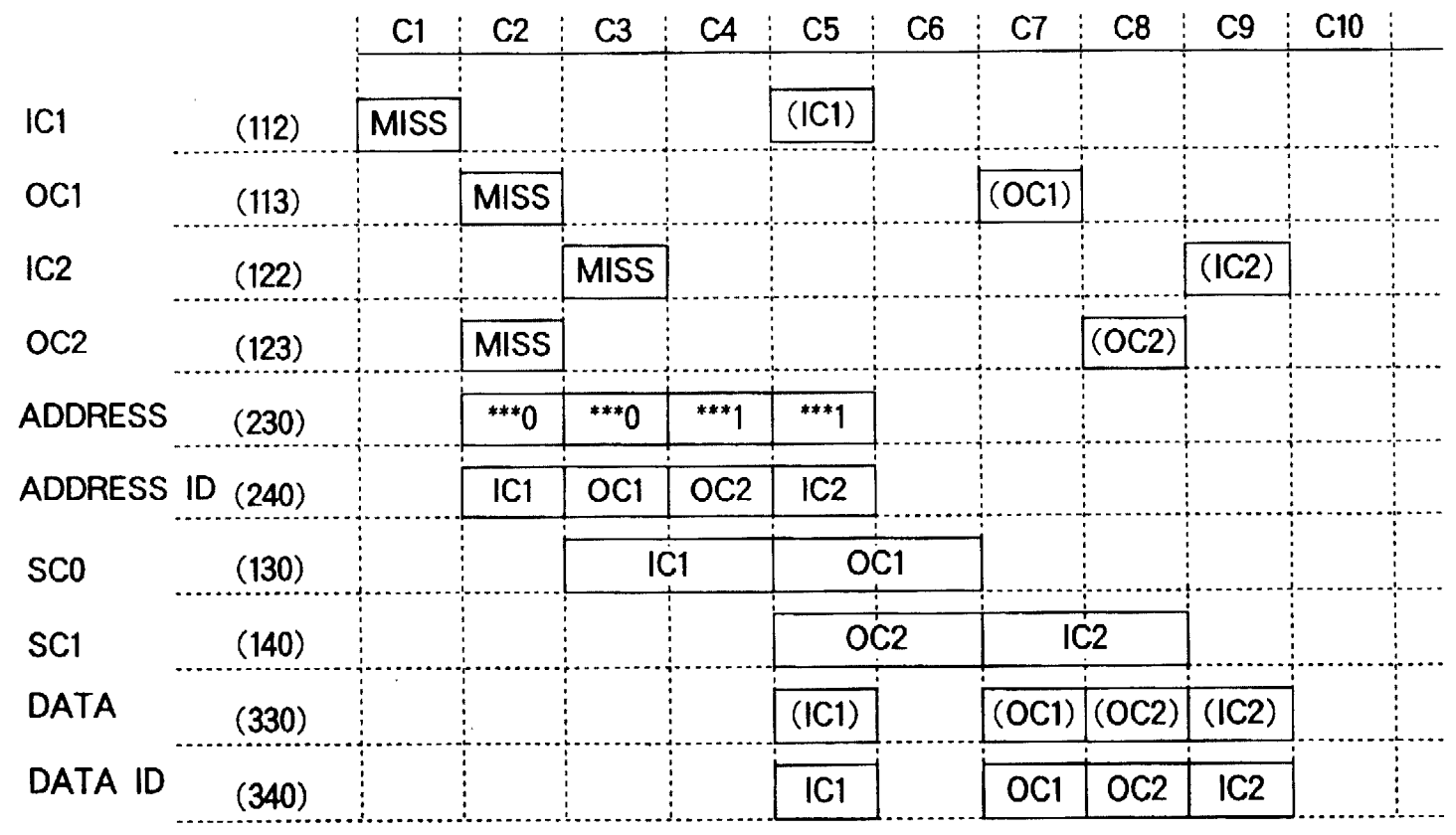

FIG. 2 is a time chart of a general pipeline operation in the multiprocessor system shown in FIG. 1.

When a decision is made that there is no desired data in the cache memory of the instruction cache IC1 (112) in the cycle C1, the instruction cache IC1 (112) requests the bus ownership of the address bus 170. In this condition, no device but the instruction cache IC1 (112) requests the bus ownership of the address bus 170.

Accordingly, in the cycle C2, the bus ownership of the address bus 170 is given to the instruction cache IC1 (112) by an address bus arbiter (not shown in FIGS.) so that the instruction cache IC1 (112) outputs signals respectively to the address signal line 230 and the identification number line 240. Then, the memory SC0 (130) judges by the lower 1 bit of the address signal line 230 that the access request is given to the memory SC0 (130).

In the cycle C3, data is read from the memory SC0 (130) on the basis of the request given from the instruction cache IC1 (112). The reading takes two cycles.

In the cycle C4, the memory SC0 (130) requests the bus ownership of the data bus 180 to transfer the read data to the instruction cache IC1 (112). In this condition, no device but the memory SC0 (130) requests the bus ownership of the data bus 180.

Accordingly, in the cycle C5, the bus ownership of the data bus 180 is given to the memory SC0 (130) by a data bus arbiter (not shown), so that the memory SC0 (130) outputs signals respectively to the data signal lines 330 and the identification number lines 340. The identification number of the instruction cache IC1 (112) is outputted to the identification number line 340, and the instruction cache IC1 (112) detects the transfer of data (accessed by the instruction cache IC1 (112)) from the identification number lines 340 and latches the contents of the data signal lines 330.

The following process is carried out in parallel with the aforementioned process.

Although two operand caches OC1 (113) and OC2 (123) request the bus ownership of the address bus 170 simultaneously in the cycle C2, the use requests for the address bus 170 are processed by the operation of the address bus arbiter (not shown) successively so that the request from the operand cache OC1 (113) is processed first in the cycle C3 and the request from the operand cache OC2 (123) is then processed in the cycle C4.

Although the lower 1 bit of the address signal lines 230 takes the value of zero and the accesses to the memory SC0 (130) are continuous in the cycles C2 and C3, the continuous accesses are buffered in the access queue 135 so that the continuous accesses are successively processed.

That is, when transfer of the read data from the memory SC0 (130) to the instruction cache IC1 (112) is finished in the cycle C4, the access queue 135 performs reading of data from the memory SC0 (130) on the basis of the request from the operand cache OC1 (113) in the cycles C5 and C6. In parallel to the data reading, the access queue 145 performs reading of data from the memory SC1 (140) on the basis of the request from the operand cache OC2 (123) in the cycles C5 and C6.

When the reading of data from the memories SC0 (130) and SC1 (140) is finished in the cycles C5 and C6, the memories SC0 (130) and SC1 (140) request the bus ownership of the data bus 180 simultaneously in the cycle C7. By the operation of the data bus arbiter (not shown), the use request for the data bus 180 from the memory SC0 (130) is processed first in the cycle C7 and the use request for the data bus 180 from the memory SC1 (140) is then processed in the cycle C8.

Access from the Same Device in Bus Lock Access

Bus lock access, which is one of the features of the present invention, will be described below with reference to FIG. 3.

Figure 3:
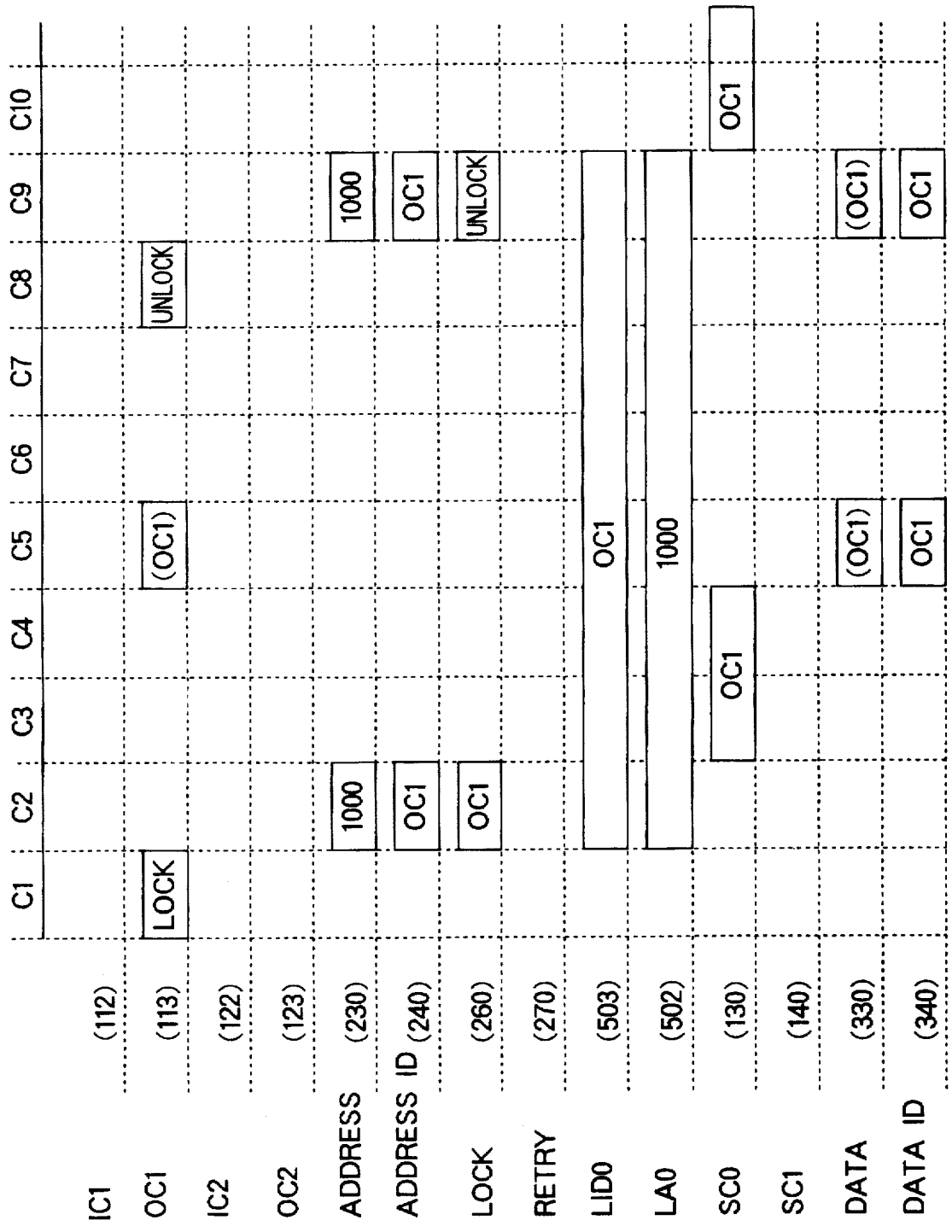
FIG. 3 is a time chart for explaining an operation at the time of bus lock performed by the system of FIG. 1.

FIG. 3 is a time chart showing the case where the operand cache OC1 (113) makes a lock access to the address number 1000 of the memory SC0 (130), that is, the case where the access from other devices to the address number 1000 is prohibited between a point in time when data is read from the address number 1000 at the first attempt at access and a point in time when data is written to the address number 1000 at the second attempt at access.

When the CPU1 (111) starts reading data with bus lock in the cycle C1, the operand cache OC1 (113) cancels (invalidates) the copy of corresponding data in the cache and makes access to the memory SC0 (130).

At this time, the operand cache OC1 (113) sends signals respectively to the address signal lines 230 and the identification number lines 240 in the cycle C2, and the operand cache OC1 (113) asserts the lock command signal line 260. The address decoder 450 detects from the address signal lines 230 that the access is from the memory SC0 (130), and sets the address portion 410, the identification number portion 420 and the read/write portion 430 of the access queue (AQ0) 135. At this time, the lock control circuit (LC0) 500 of the access queue (AQ0) 135 detects by the lock command signal line 260 that the access is a lock access, and sets the lock-in indicative flag register (LV0) 501, the lock address register (LA0) 502 and the lock identification number register (LID0) 503.

In the cycles C3, C4 and C5, the same pipeline access as the general access is performed. That is, in the cycles C3 and C4, the access queue (AQ0) 135 performs reading of data from the memory SC0 (130). Then, in the cycle C5, the queue acquires the bus ownership of the data bus 180 so that the data is transferred from the memory SC0 (130) to the operand cache OC1 (113) and stored therein. In the cycles C3, C4 and C5, the values in the lock-in indicative flag register (LV0) 501, the lock address register (LA0) 502 and the lock identification number register (LID0) 503 are retained.

When an unlocking process is started in the cycle C8, the operand cache OC1 (113) starts the access to the memory SC0 (130) so that the CPU1 (111) can write data to the lock address.

That is, in the cycle C9, the operand cache OC1 (113) sends signals to the address signal lines 230 and the identification number lines 240, and, at the same time, negates the lock command signal line 260 to give an unlock instruction to the memory SC0 (130). The address decoder 450 detects that the access is to the memory SC0 (130) from the address signal lines 230 and sets the address portion 410, the identification number portion 420 and the read/write portion 430 of the access queue (AQ0) 135.

At this time, the lock control circuit (LC0) 500 in the access queue (AQ0) 135 detects that the access is to the lock address and from the device having the same identification number, on the basis of the result of the address comparator 504 and the identification number comparator 505, which respectively compare the address signal lines 230 and the identification number lines 240 on the address bus with the contents of the lock address register (LA0) 502 and the lock identification number register (LID0) 503, respectively. Further at this time, the lock-in indicative flag register (LV0) 501 is reset because the lock command signal line 260 is negated, and the write access from the operand cache OC1 (113) is accepted because the lock access is released.

In and after the cycle C10, the pipeline write access to the memory SCO (130) is performed by using the access queue (AQ0) 135 in the same manner as the general access.

As described above, the device is identified as a lock requester by the lock identification number register (LID0) 503 and the identification number comparator 505 so that the access from the lock requester can be accepted. Accordingly, there is no risk of dead lock caused by the lock by the lock requester itself.

Operation of Prohibiting Access from Another Device in Bus Lock Access

Figure 4:
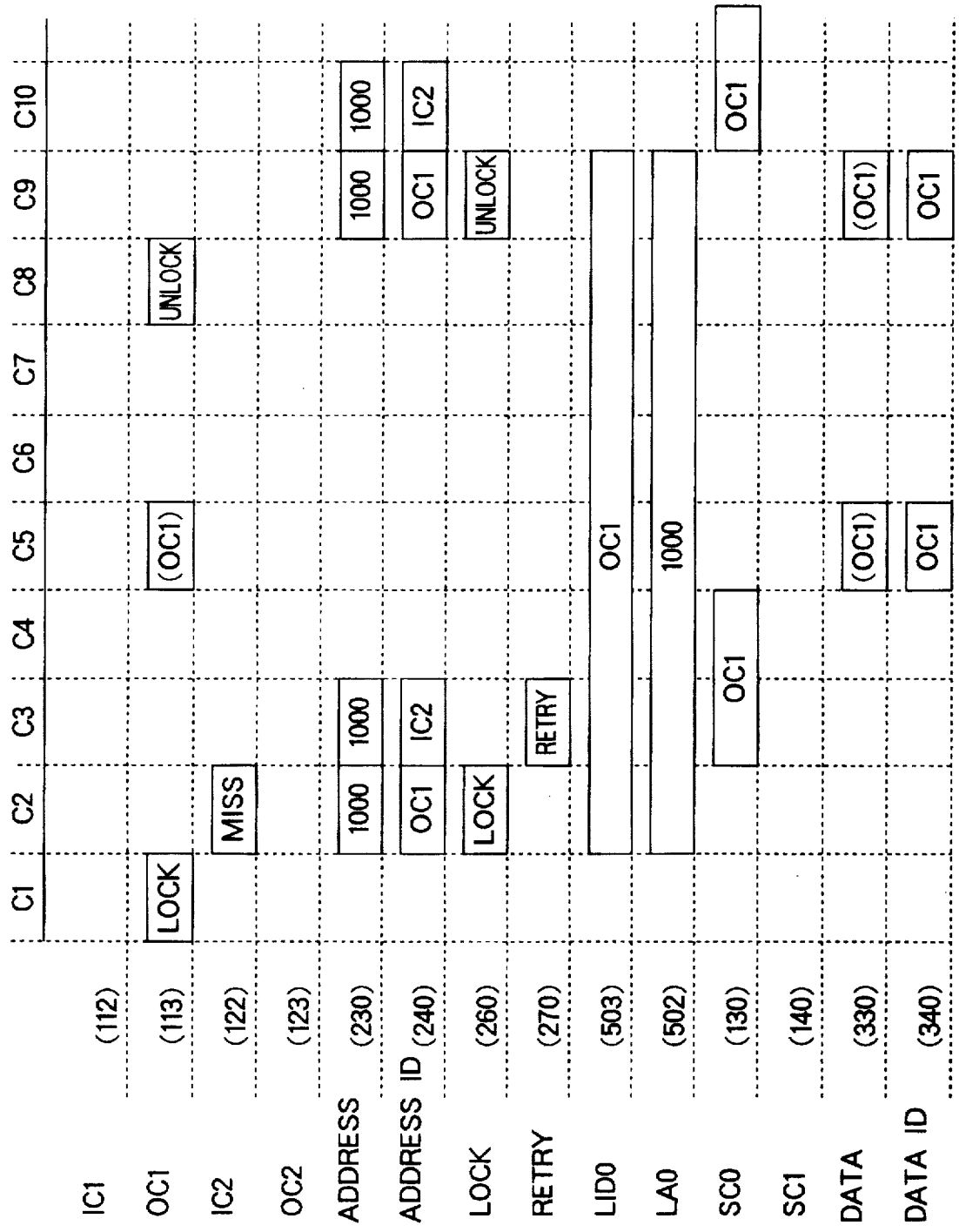
FIG. 4 is a time chart for explaining an exclusive operation at the time of bus lock performed by the system of FIG. 1.
Figure 5:
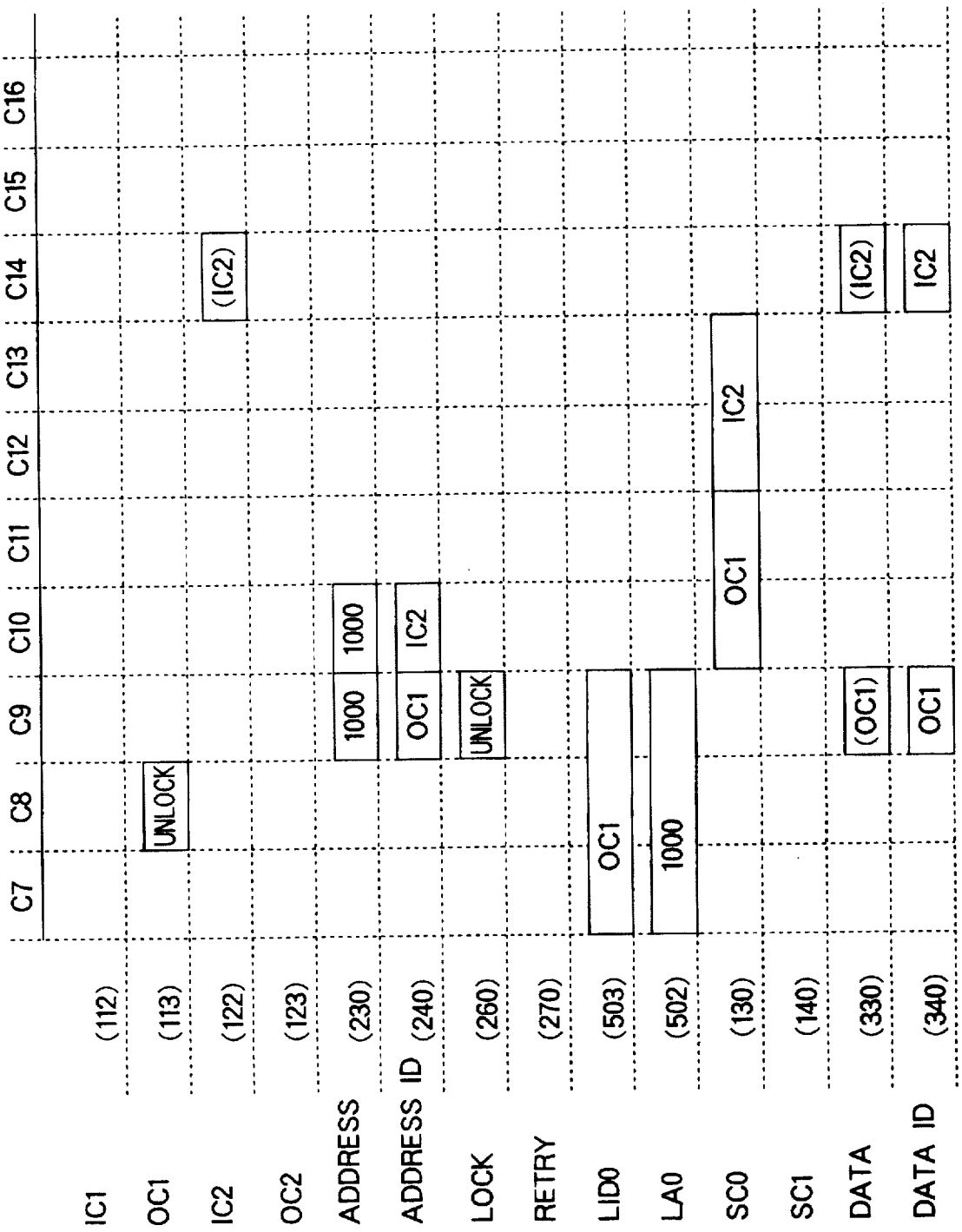
FIG. 5 is a time chart for explaining an exclusive operation at the time of bus lock performed by the system of FIG. 1.

FIGS. 4 and 5 are time charts showing the case where another device requests access to the address (address number 1000) while the OC1 (113) makes a lock access to the address of the SC0 (130). FIG. 4 shows a period of time from the first cycle to the tenth cycle. FIG. 5 shows a period of time from the seventh cycle to the sixteenth cycle.

When the CPU1 (111) starts reading data with a bus lock in the cycle C1, the OC1 (113) cancels (invalidates) the copy of the corresponding data in the cache and makes an access to the memory SC0 (130).

That is, in the cycle C2, the OC1 (113) sends signals respectively to the address signal lines 230 and the identification number lines 240, and, at the same time, asserts the lock command signal line 260. The address decoder 450 detects the access to the memory SC0 (130) from the state of the address signal lines 230 and sets the address portion 410, the identification number portion 420 and the read/write portion 430 of the access queue (AQ0) 135. At this time, the lock control circuit (LC0) 500 in the access queue (AQ0) 135 detects the lock access by the lock command signal line 260 and sets the lock-in indicative flag register (LV0) 501, the lock address register (LA0) 502 and the lock identification number register (LID0) 503.

In the cycles C3, C4 and C5, a pipeline access is performed in the same way as the general access previously described. That is, in the cycles C3 and C4, the access queue (AQ0) 135 performs reading of data from the memory SC0 (130). Then, in the cycle C5, the bus ownership of the data bus 180 is acquired so that the data is transferred from the memory SC0 (130) to the operand cache OC1 (113) and stored therein. In the cycles C3, C4 and C5, the contents of the lock-in indicative flag register (LV0) 501, the lock address register (LA0) 502 and the lock identification number register (LID0) 503 are retained.

When an unlocking process is started in the cycle C8, the operand cache OC1 (113) starts an access to the memory SC0 (130) so that the CPU1 (111) can write the data in the lock address.

That is, in the cycle C9, the operand cache OC1 (113) sends signals to the address signal lines 230 and the identification number lines 240, and, at the same time, negates the lock command signal line 260 to give an unlock instruction to the memory SC0 (130). The address decoder 450 detects the access to the memory SC0 (130) by the state of the address signal lines 230 and sets the address portion 410, the identification number portion 420 and the read/write portion 430 of the access queue (AQ0) 135.

At this time, the lock control circuit (LC0) 500 in the access queue (AQ0) 135 detects that the access is to the lock address and is from the device of the same identification number, on the basis of the address comparator 504 and the identification number comparator 505, which respectively compare the address signal lines 230 and the identification number lines 240 on the address bus with the contents of the lock address register (LA0) 502 and the lock identification number register (LID0) 503, respectively. Further, at this time, the lock-in indicative flag register (LV0) 501 is reset because the lock command signal line 260 is negated, and the write access from the operand cache OC1 (113) is accepted because the lock access is released.

On the contrary, it is now assumed that the IC2 (122) makes an access to the address (address number 1000) of the SC0 (130) by mistake in the cycle C2.

Accordingly, in the cycle C3, the IC2 (122) sends signals respectively to the address signal lines 230 and the identification number lines 240 on the basis of the mistake in the IC2 (122). Further, the address decoder 450 detects the access to the memory SC0 (130) by the address signal lines 230 and sets the address portion 410, the identification number portion 420 and the read/write portion 430 of the access queue (AQ0) 135. At this time, the lock control circuit (LCO) 500 in the access queue (AQ0) 135 detects that the access is an access from a device having a different identification number, on the basis of the address comparator 504 and the identification number comparator 505, which respectively compare the address signal lines 230 and the identification number lines 240 on the address bus with the contents of the lock address register (LAO) 502 and the lock identification number register (LID0) 503, respectively, because the lock-in indicative flag register (LVO) 501 has been already set. The lock control circuit (LCO) 500 asserts the retry command signal 270 [by] from the AND gate 506 to reply that the access is rejected by the lock. The IC2 (122) receives the retry command signal 270 so that the IC2 (122) can retry its request for access after the passage of a predetermined time (in this embodiment, seven cycles). The contents set in the address portion 410, the identification number portion 420 and the read/write portion 430 of the access queue (AQ0) 135 are canceled on the basis of the retry command signal 270.

As described above, in the cycle C10 after the passage of seven cycles from cycle C3, the IC2 (122) sends signals respectively to the address signal lines 230 and the identification number lines 240 again. The address decoder 450 detects the access to the memory SC0 (130) by the address signal lines 230 and sets the address portion 410, the identification number portion 420 and the read/write portion 430 of the access queue (AQ0) 135. At this time, the lock control circuit (LC0) 500 in the access queue (AQ0) permits the access as a general access because the lock-in indicative flag register (LVO) 501 has been already reset.

That is, the access of the IC2 (122) is started from the cycle C12 because the memory SCO (130) is used for the access of the OC1 (113) in the cycles C10 and C11.

As described above, the lock address is recognized by the lock address register (LA0) 502 and the address comparator 504 so that an access from devices other than the lock requester is rejected. Accordingly, an exclusive control can be provided. Furthermore, in the case where a device other than the lock requester requests access to the lock address, an access retry instruction can be given to the access requester by outputting the retry command signal 270. Accordingly, the access can be accepted after unlocking.

Access to Different Addresses in Bus Lock Access

Figure 6:
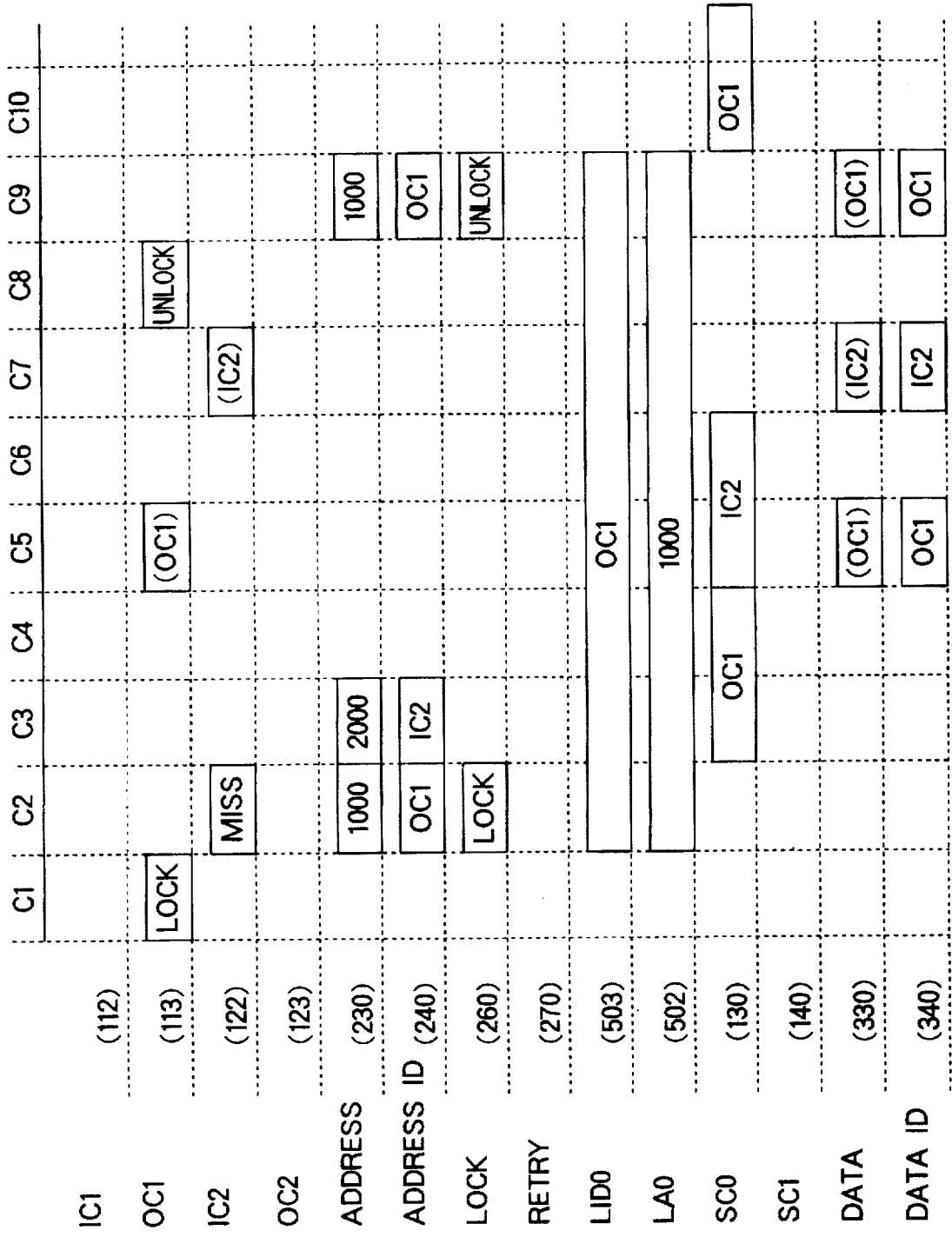
FIG. 6 is a time chart for explaining a parallel operation at the time of bus lock performed by the system of FIG. 1.

FIG. 6 is a time chart showing the case where another device requests an access to a different address (address number 2000) while the OC1 (113) makes a lock access to an address (address number 1000).

The operation of the OC1 (113) is the same as shown in FIG. 3.

When the CPU1 (111) starts reading data with a bus lock in the cycle C1, the OC1 (113) cancels (invalidates) the copy of the corresponding data in the cache and makes access to the memory SC0 (130).

That is, in the cycle C2, the OC1 (113) sends signals respectively to the address signal lines 230 and the identification number lines 240 and, at the same time, asserts the lock command signal line 260. The address decoder 450 detects the access to the memory SC0 (130) by the state if the address signal lines 230 and sets the address portion 410, the identification number portion 420 and the read/write portion 430 of the access queue (AQ0) 135. At this time, the lock control circuit (LC0) 500 of the access queue (AQ0) 135 detects by the lock command signal line 260 that the access is a lock access, and sets the lock-in indicative flag register (LV0) 501, the lock address register (LA0) 502 and the lock identification number register (LID0) 503.

In the cycles C3, C4 and C5, a pipeline access is performed in the same way as the general access previously described. That is, in the cycles C3 and C4, the AQ0 135 performs reading of data from the memory SC0 (130). Then, in the cycle C5, the bus ownership of the data bus 180 is acquired so that data is transferred from the SC0 (130) to the OC1 (113) and stored therein. In the cycles C3, C4 and C5, the contents of the lock-in indicative flag register (LV0) 501, the lock address register (LA0) 502 and the lock identification number register (LID0) 503 are retained.

When an unlocking process is started in the cycle C8, the OC1 (113) starts an access to the memory SC0 (130) so that the CPU1 (111) can write data in the lock address.

That is, in the cycle C9, the OC1 (113) sends signals to the address signal lines 230 and the identification number lines 240, and, at the same time, negates the lock command signal line 260 to give an unlock instruction to the memory SC0 (130). The address decoder 450 detects the access to the memory SC0 (130) by the state of the address signal lines 230 and sets the address portion 410, the identification number portion 420 and the read/write portion 430 of the AQ0 135.

At this time, the lock control circuit (LC0) 500 in the access queue (AQ0) 135 detects that the access is to the lock address and is from the device of the same identification number, on the basis of the address comparator 504 and the identification number comparator 505, which respectively compare the states of the address signal lines 230 and the identification number lines 240 on the address bus with the contents of the lock address register (LA0) 502 and the lock identification number register (LID0) 503, respectively. Further, at this time, the lock-in indicative flag register (LV0) 501 is reset because the lock command signal line 260 is negated, and the write access from the operand cache OC1 (113) is accepted because the lock access is released.

On the contrary, it is now assumed that the IC2 (122) makes access to the address (address number 2000) of the SC0 (130) by mistake in the cycle C2.

Accordingly, in the cycle C3, the IC2 (122) sends signals respectively to the address signal lines 230 and the identification number lines 240. The address decoder 450 detects the access to the memory SC0 (130) by the state of the address signal lines 230 and sets the address portion 410, the identification number portion 420 and the read/write portion 430 of the access queue (AQ0) 135. At this time, the lock-in indicative flag register (LV0) 501 has been already set, but the lock control circuit (LC0) 500 in the access queue (AQ0) 135 detects that the access is access to an address different from the lock address, on the basis of the address comparator 504 and the identification number comparator 505 which respectively compare the states of the address signal lines 230 and the identification number lines 240 of the address bus with the contents of the lock address register (LA0) 502 and the lock identification number register (LID0) 503, respectively. Accordingly, the access is accepted.

That is, the lock access of the OC1 (113) is performed in the same manner as shown in FIG. 3.

That is, the read access of the IC2 (122) is started in the cycle C5 because the memory SC0 (130) is used for the read access of the OC1 (113) in the cycles CS and C4.

As described above, the lock address is recognized by the lock address register (LA0) 502 and the address comparator 504 so that the access to other addresses than the lock address can be accepted. Accordingly, not only exclusive control can be provided but memory access throughput can be improved.

In this embodiment, the contents of the address bus are latched in the access queue after the address transfer. Accordingly, the address bus can be released soon without waiting for return data, so that another device can start a new bus access.

An arbiter circuit exclusively used for determining the bus ownership of the data bus is provided. Accordingly, the bus user of the data bus can be determined independent of the bus user of the address bus. Only the data bus can be used in transfer of read data independent of the address bus.

Device identification numbers are preliminarily assigned to devices which are permitted to make access to the shared bus. When address data is sent out, a corresponding identification number is sent out simultaneously. Accordingly, even in the case where a plurality of accesses are buffered on the memory side, there is no confusion.

The memory is divided into banks, so that memory accesses to different banks can be processed in parallel. By the operations of two banks of memories and two banks of access buffers, in the case where accesses are concentrated into one bank, the malfunctioning can be avoided. And, in the case where different banks are accessed, accesses can be made regardless of accesses awaited by the other bank. Accordingly, the throughput can be improved.

In lock access, the address is latched in the lock address register. Accordingly, even in the case where the address bus is released soon without waiting for the completion of access after the address is sent out, the accesses from other devices to the same address can be prohibited.

Since the address bus is released as described above, the access to an address different from the lock address can be made in parallel with the access to the lock address. Accordingly, the access throughput can be improved.

Furthermore, the access from another device to the lock address is prohibited during the lock period, but an access retry instruction is given to the access requester on the basis of a retry signal. Accordingly, the access can be accepted after unlocking, so that endless prohibition of access can be avoided.

Figure 7:
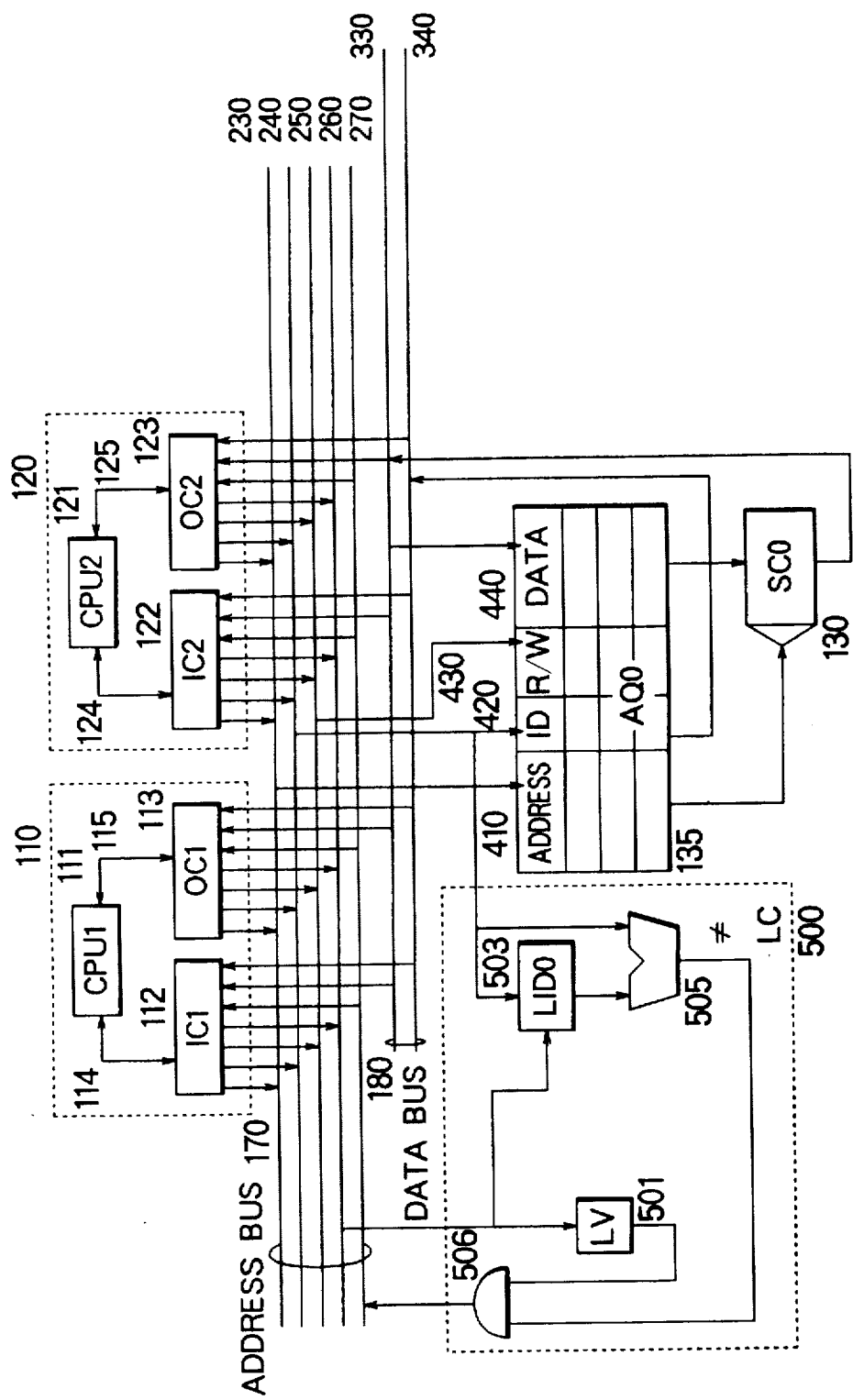
FIG. 7 is a schematic block diagram showing a multiprocessor system having an exclusively controllable memory as a comparative example to help in understanding the present invention.

FIG. 7 is a block diagram showing the structure of the one-chip multiprocessor system providing a comparative example for deepening an understanding of the present invention. The processor elements 110 and 120, the memory 130, the access queue 135, the address bus 170 and the data bus 180 shown in FIG. 1 are used in this comparative example.

The comparative example shown in FIG. 7 is different from the embodiment shown in FIG. 1 in that a single access queue 135, a single memory 130 and a single lock control circuit (LC) 500 are provided in FIG. 7 and that the lock control circuit (LC) 500 includes a lock-in indicative flag register (LV) 501, a lock identification number register (LID) 503, an identification number comparator 505 and an AND gate 506.

The lock-in indicative flag register (LV) 501 is set when the lock command signal line 260 is asserted at the time of the address transfer. The lock identification number register (LID) 503 latches the contents of the identification number line 240 when the lock-in indicative flag register (LV) 501 is set. The identification number comparator 505 compares the value of the identification number lines 240 with the contents of the lock identification number register (LID) 503 at the time of the address transfer. When the lock access (asserting the lock command signal line 260) is issued from a device having a different identification number, the retry command signal line 270 is asserted by the AND gate 506 to thereby reject the acceptance of the access. Accordingly, in the multiprocessor system of this example, only one processor can be permitted to make a lock access, so that exclusive accesses can be provided. Although this example involves the case where the memory is not divided into banks, there is no trouble even in the case where the memory is divided into banks because the banks can be monolithically managed by the lock control circuit (LC) 500.

Figure 8:
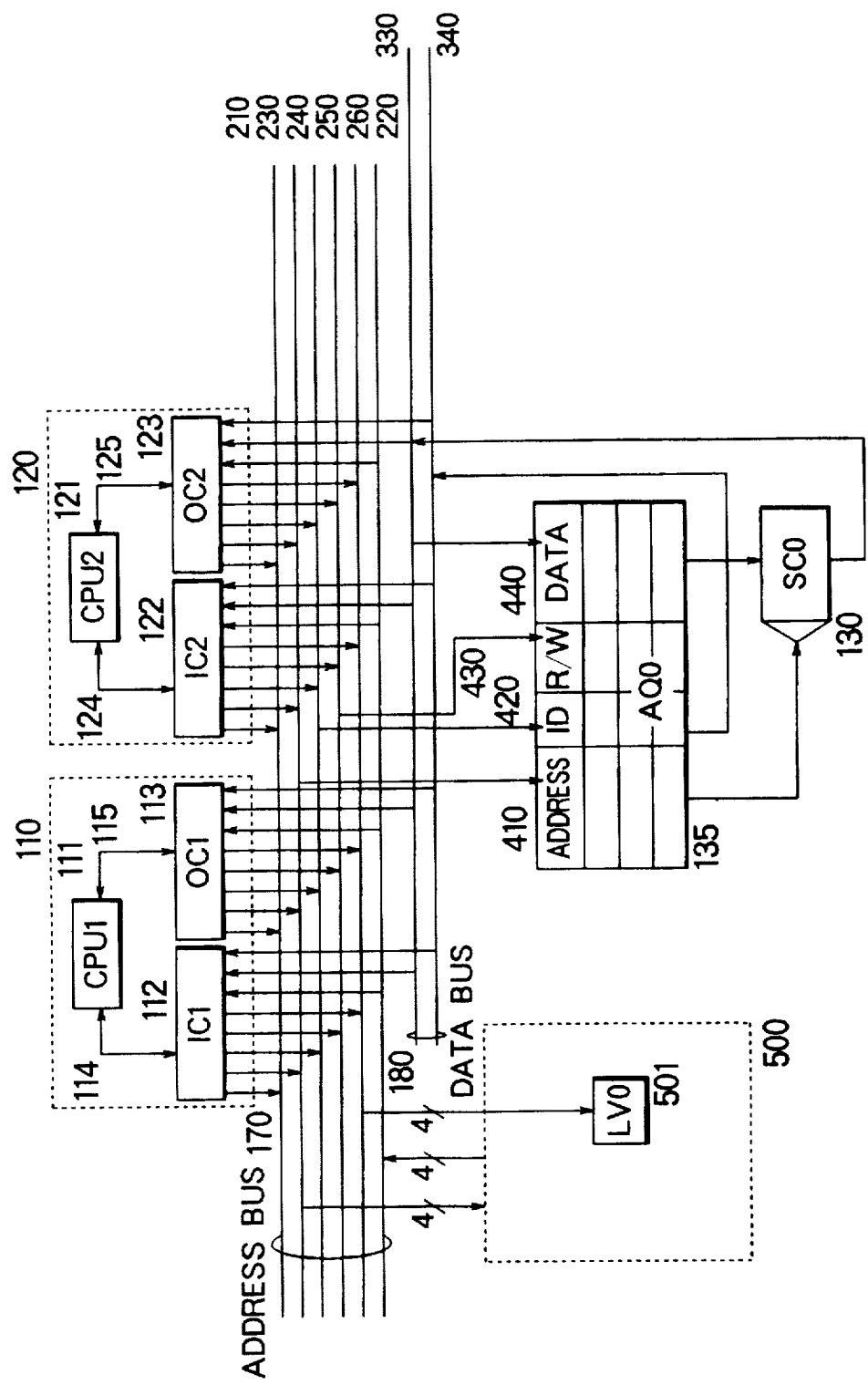
FIG. 8 is a schematic block diagram showing a multiprocessor system having an exclusively controllable memory as another comparative example.

FIG. 8 is a block diagram showing the structure of a one-chip multiprocessor system providing another comparative example for deepening an understanding of the present invention. The processor elements 110 and 120, the memory 130, the access queue 135, the address bus 170 and the data bus 180 shown in FIG. 1 are used in FIG. 8.

In FIG. 8, however, each of the bus request signal lines 210, the bus grant signal lines 220 and the lock command signal lines 260 includes four signal lines corresponding to the cache memories 112, 113, 122 and 123 as requesters.

The bus arbiter 500 includes a lock-in indicative flag register (LV) 501. When a lock command signal line 260 is asserted at the time of an acceptance of a bus request, the lock-in indicative flag register (LV) 501 is checked. And, when the LV has been already asserted, the acceptance of the access request is rejected.

In a multiprocessor system having the aforementioned structure of this comparative example, only one processor can be permitted to make a lock access, so that exclusive accesses can be provided. Although this example also involves the case where the memory is not divided into banks, there is no trouble even in the case where the memory is divided into banks because the banks can be monolithically managed by the bus arbiter (LC) 500.

Figure 9:
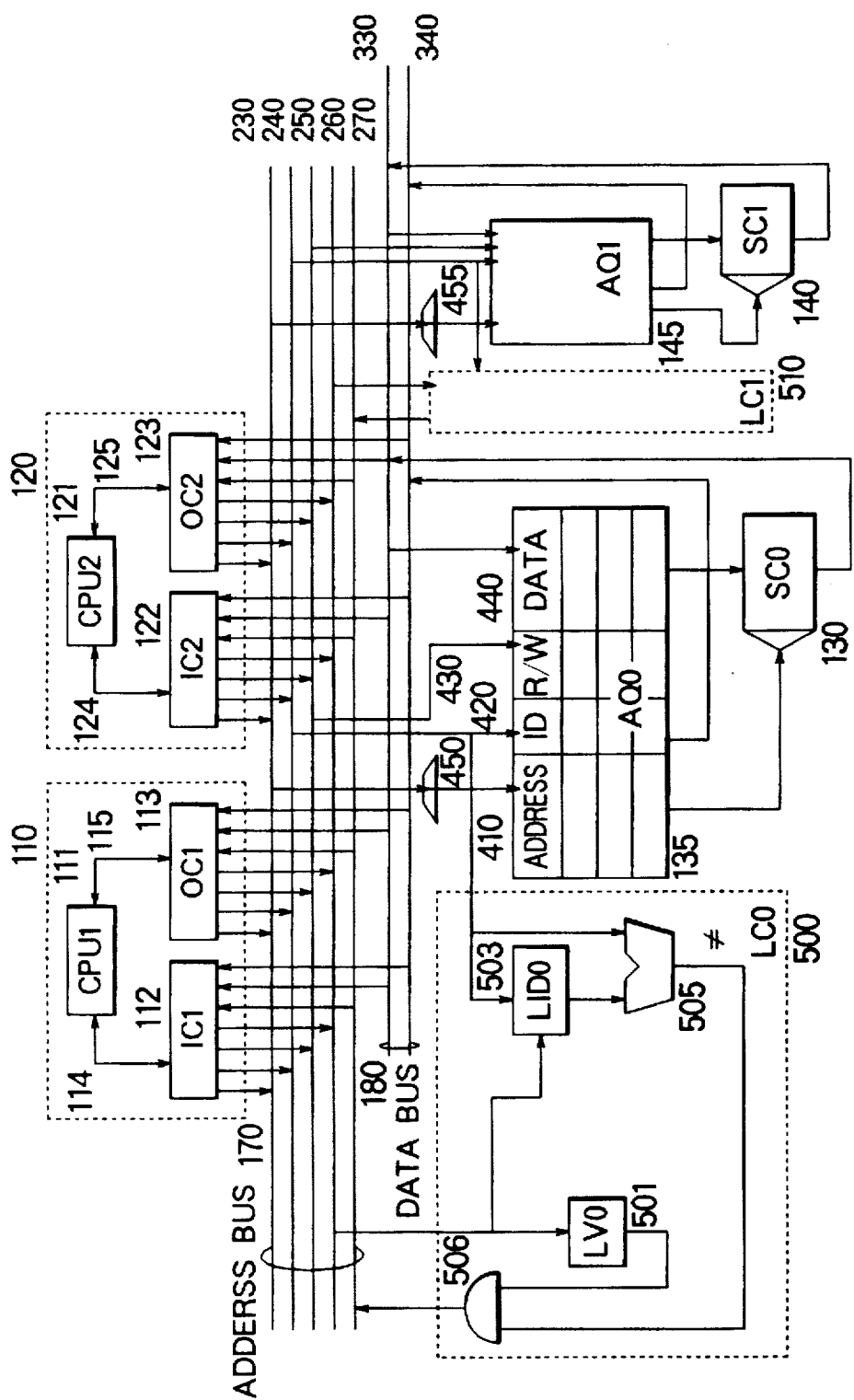
FIG. 9 is a schematic block diagram showing a multiprocessor system having an exclusively controllable memory as a further comparative example.

FIG. 9 is a block diagram showing the structure of a one-chip multiprocessor system providing a further comparative example for deepening an understanding of the present invention. The processor elements 110 and 120, the memories 130 and 140, the access queues 135 and 145, the address bus 170 and the data bus 180 shown in FIG. 1 are also used in FIG. 9.

The lock control circuit (LC0) 500 includes a lock-in indicative flag register (LV0) 501, a lock identification number register (LID0) 503, an identification number comparator 505 and an AND gate 506. The lock-in indicative flag register (LV0) 501 is set when the lock command signal line 260 is asserted at the time of the address transfer to the memory 130. The lock identification number register (LID0) 503 latches the contents of the identification number lines 240 when the lock-in indicative flag register (LV0) 501 is set. The identification number comparator 505 compares the value of the identification number lines 240 with the contents of the lock identification number register (LID0) 503 at the time of the address transfer. When lock access (asserting the lock command signal line 260) is issued from a device having a different identification number, the retry command signal line 270 is asserted from the AND gate 506 to thereby reject the acceptance of the access. Accordingly, in the multiprocessor system of this example, only one processor can be permitted to make a lock access to one memory (130 or 140), so that exclusive accesses can be provided. The lock control circuit (LC1) 501 has the same structure as that of the lock control circuit (LC0) 500 and serves to control lock access to the memory 140.

In the examples of the multiprocessor system shown in FIGS. 7 through 9, an exclusive access can be provided because an access from another processor to shared data can be rejected when one processor is accessing the shared data. However, the requests for access to addresses different from the lock access data address cannot be accepted, so that a decline in the efficiency caused by the bus lock increases, resulting in a problem.

On the contrary, in the embodiment shown FIG. 1, there is no decline in the efficiency caused by the bus lock, because the requests for access to addresses different from the lock access data address can be accepted.

Having described embodiments of the present invention in detail, it is to be understood that the invention is not limited to the disclosed embodiments and that various changes may be made without departing from the spirit of the invention.

For example, several changes may be made to the method for assigning addresses to the memories 130 and 140. Address interleaving is the first method. For example, in this method, continuous address numbers are assigned to different memories successively so that address numbers 0, 2, ... are assigned to the memory 130 and address numbers 1, 3, ... are assigned to the memory 140. Dividing memories by areas is the second method. For example, in this method, continuous address numbers are assigned to each memory successively so that address numbers 0 to 499 are assigned to the memory 130 and address numbers 500 to 999 are assigned to the memory 140, for example.

Although the aforementioned embodiments involve a case where each of the memories 130 and 140 is a simple memory device, the invention can be applied to the case where each of the memories 130 and 140 may be a cache memory, as a further embodiment.

Although the aforementioned embodiments involve a case where the memory is divided into two banks, the case where the memory is divided into four banks or more is included within the scope of the present invention.

Although the aforementioned embodiments involve a case where two processor elements are used, the case where three processors or more are used is included within the scope of the present invention.

The present invention has the following effects.

Since the flag register is asserted while a lock access is performed, another device can be prohibited from making a lock access even in the case where the address bus is released soon without waiting for the completion of the access after the address transfer.

Since the address bus is released as described above, an access to a different address can be made in parallel with the access to the lock address while the lock access is performed. Accordingly, the access throughput can be improved.

Furthermore, since an access from another device to a shared variable is prohibited but not canceled while the lock access is performed, the access can be accepted after unlocking. Accordingly, an endless prohibition of an access can be avoided.

What is claimed is:

1. A multiprocessor system comprising:

a memory;

a bus including a first bus for sending a memory access request to said memory and a second bus for returning data read from said memory in response to said memory access request;

a plurality of processors connected to each other through said bus, each of said plurality of processors having an instruction cache and an operand cache;

said memory being connected to said plurality of processors via said bus;

a memory access control circuit connected to said plurality of processors via said bus, including a flag register, an address register, an identification number register, and a signal gate circuit; and an access queue connected to said bus and said memory, constituted by a first-in-first-out (FIFO) memory;

wherein a bus ownership of said first bus is arbitrated independently of a bus ownership of said second bus, said first bus and said second bus being provided with respective, separate arbiters;

wherein in each processor, in the case of lock accessing data, said processor invalidates data in said operand cache included in said processor, the invalidated data corresponding to locked data in said memory;

wherein each of said plurality of processors sends an identification number, a read/write signal and a lock signal to said first bus at the same cycle as said processor sends an access request address to said first bus, after acquiring a bus ownership of said first bus, and said first bus is released after the cycle;

wherein said memory stores data shared by said processors;

wherein said FIFO memory stores access request addresses, identification numbers and read/write signals transmitted through said first bus and write data of write access requests sent from one of said plurality of processors to said second bus;

wherein data read from said memory and one of said identification number stored in said FIFO memory are sent to said second bus after acquiring a bus ownership of said second bus;

wherein said flag register registers a flag indicating said lock access responsive to said lock signal on said first bus;

wherein said address register registers a lock access address;

wherein said identification number register registers an identification number of a processor which requests a lock access;

wherein an address comparator compares an address registered in said address register with an address on said first bus;

wherein an identification number comparator compares an identification number registered in said identification number register with an identification number on said first bus;

wherein said signal gate circuit is supplied with an output from said flag register, an output from said address comparator and an output from said identification number comparator;

wherein, when said flag indicating said lock access is set in said flag register, a signal for rejecting acceptance of a memory access request and for prompting access retry is generated as an output from said signal gate circuit of said memory access control circuit when an address registered in said address register coincides with an address on said first bus and when an identification number registered in said identification number register does not coincide with an identification number on said first bus; and wherein, when said flag indicating said lock access is set in said flag register, a signal for accepting a memory access request is generated as an output from said signal gate circuit of said memory access control circuit when an address registered in said address register does not coincide with an address on said first bus.

2. A multiprocessor system according to claim 1, wherein said memory is divided into a plurality of banks; and
wherein said access queue is divided into groups corresponding to the number of said banks of said memory.

3. A multiprocessor system according to claim 1, wherein said bus, said processors, said memory, said memory access control circuit and said access queue are formed on one chip.

* * * * *